Oct. 29, 1968 R. L. KEYT ET AL 3,408,241
METHOD OF MAKING TUBULAR FIBER REINFORCED RESIN ARTICLES
Filed March 2, 1965 6 Sheets-Sheet 3

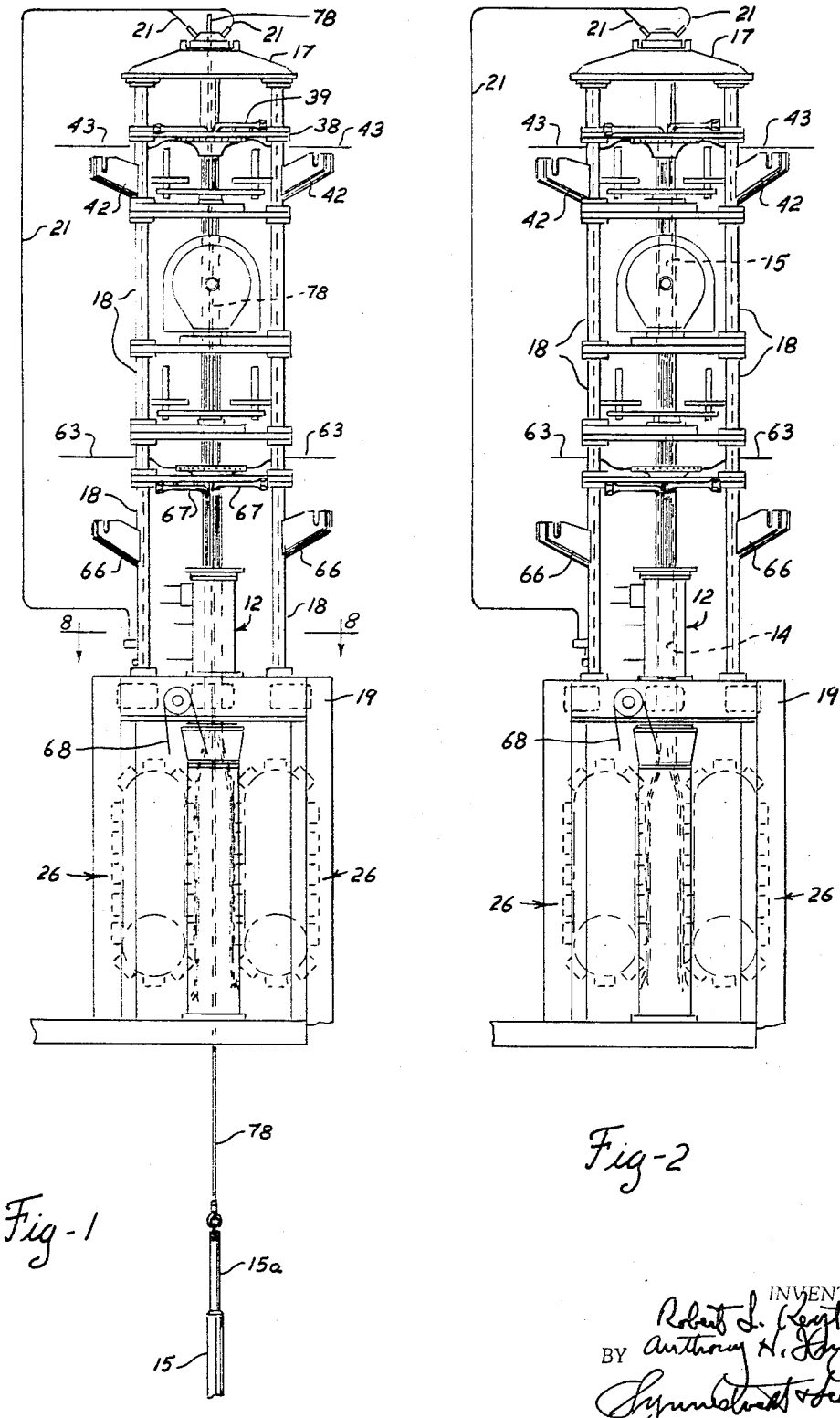

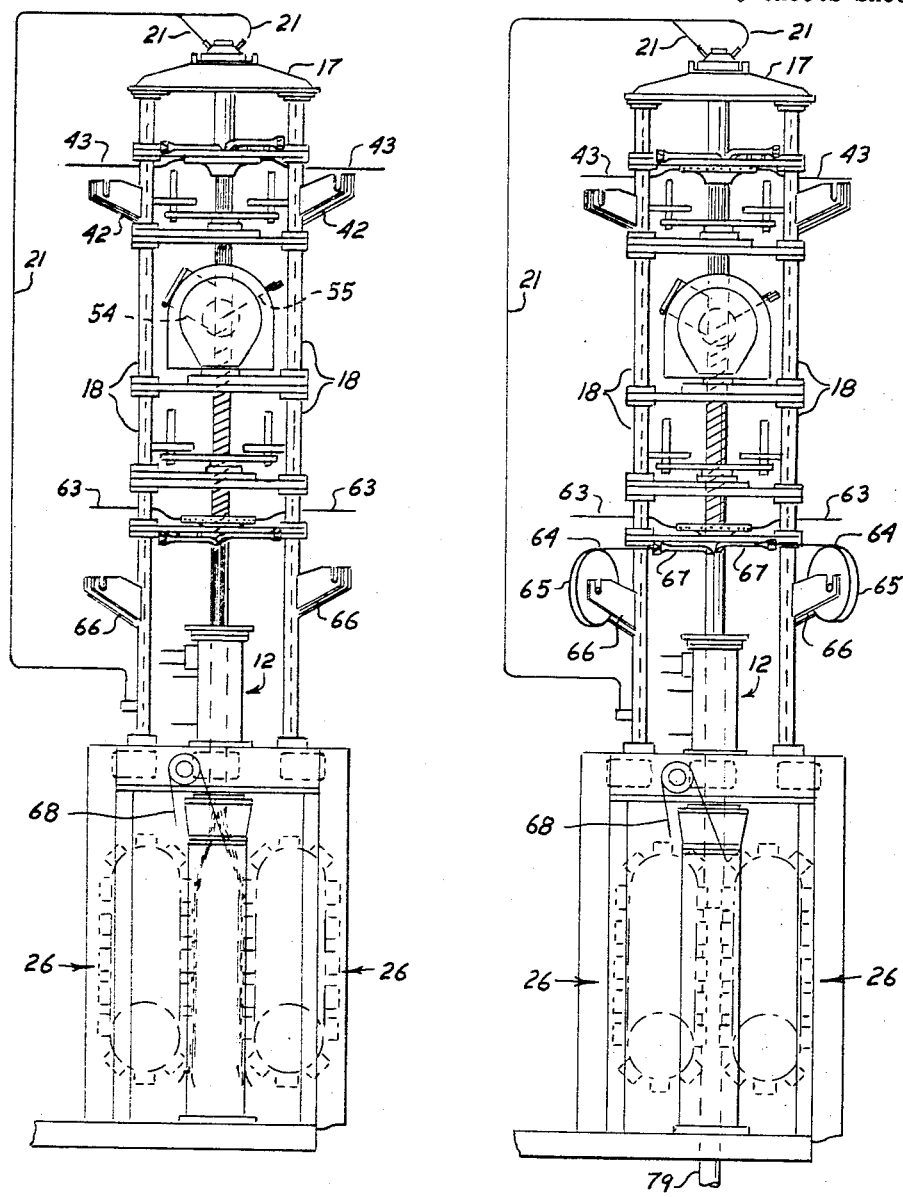

INVENTORS
Robert L. Keyt
Anthony H. Ingle
BY
Synnestvedt & Lechner
ATTORNEYS

Fig-7

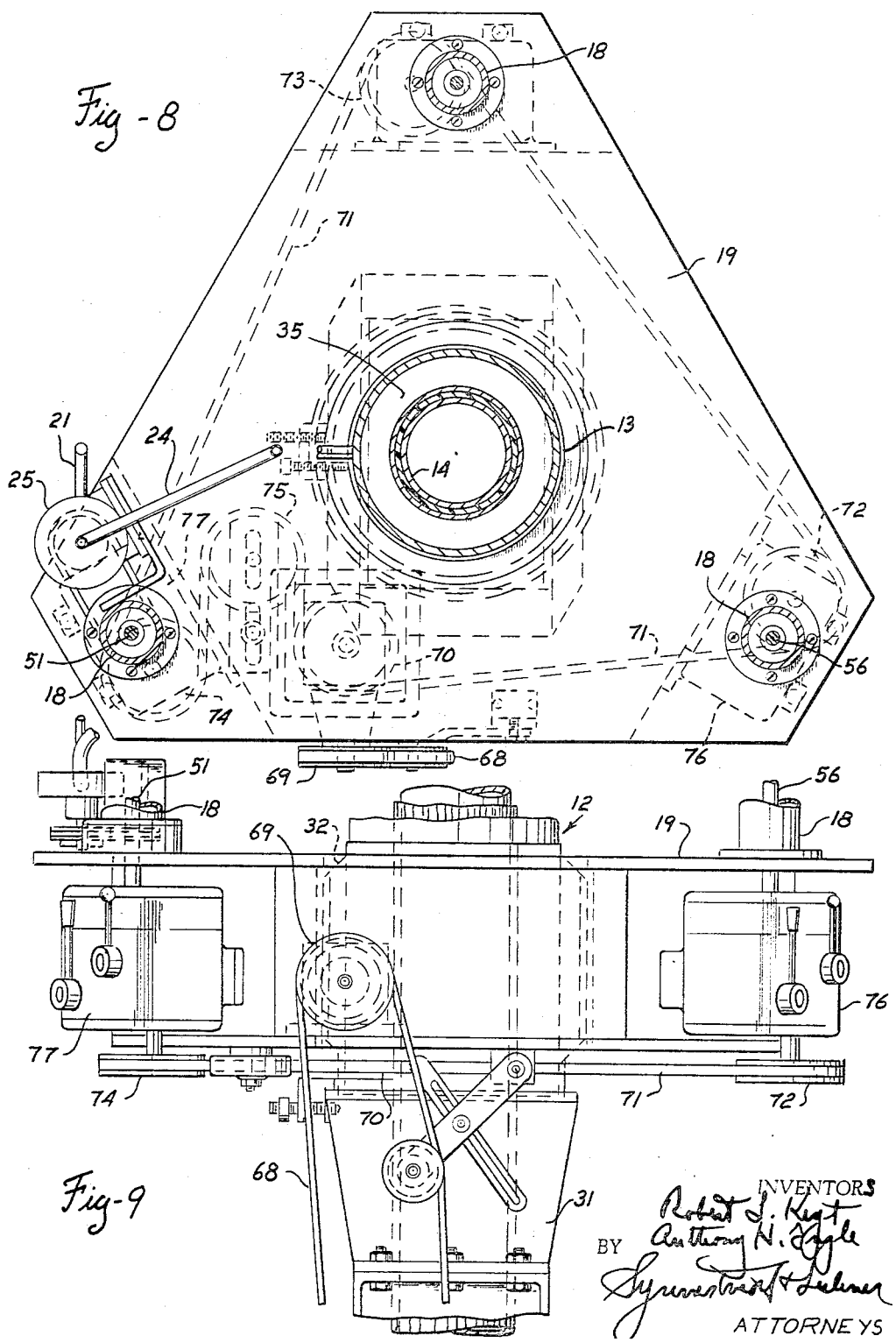

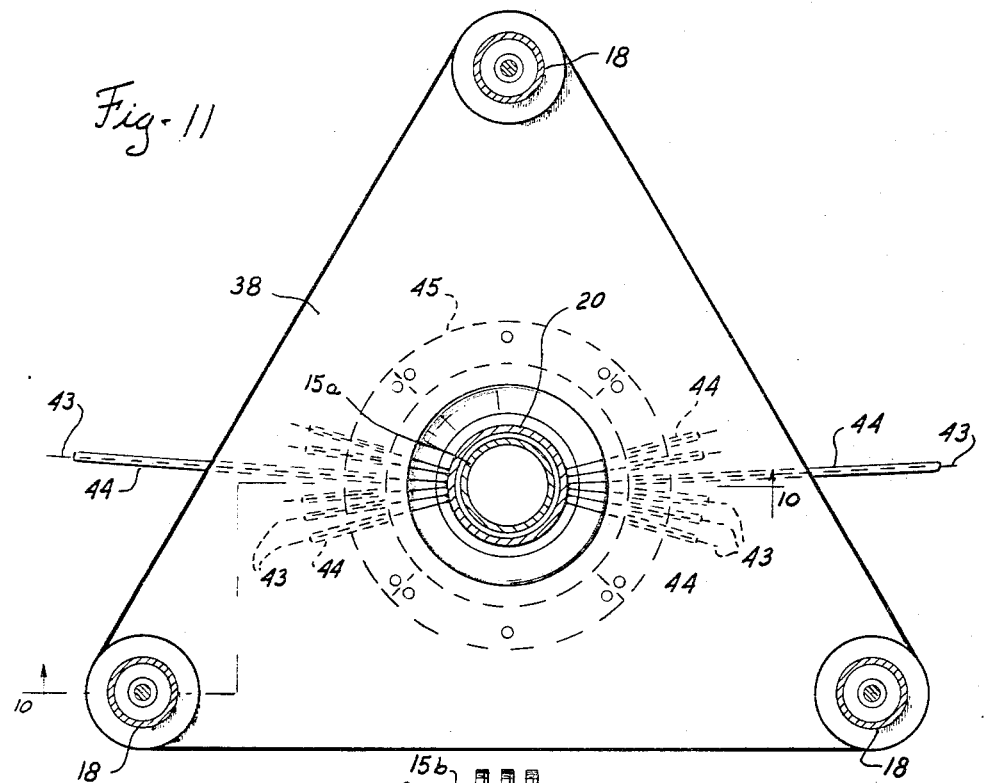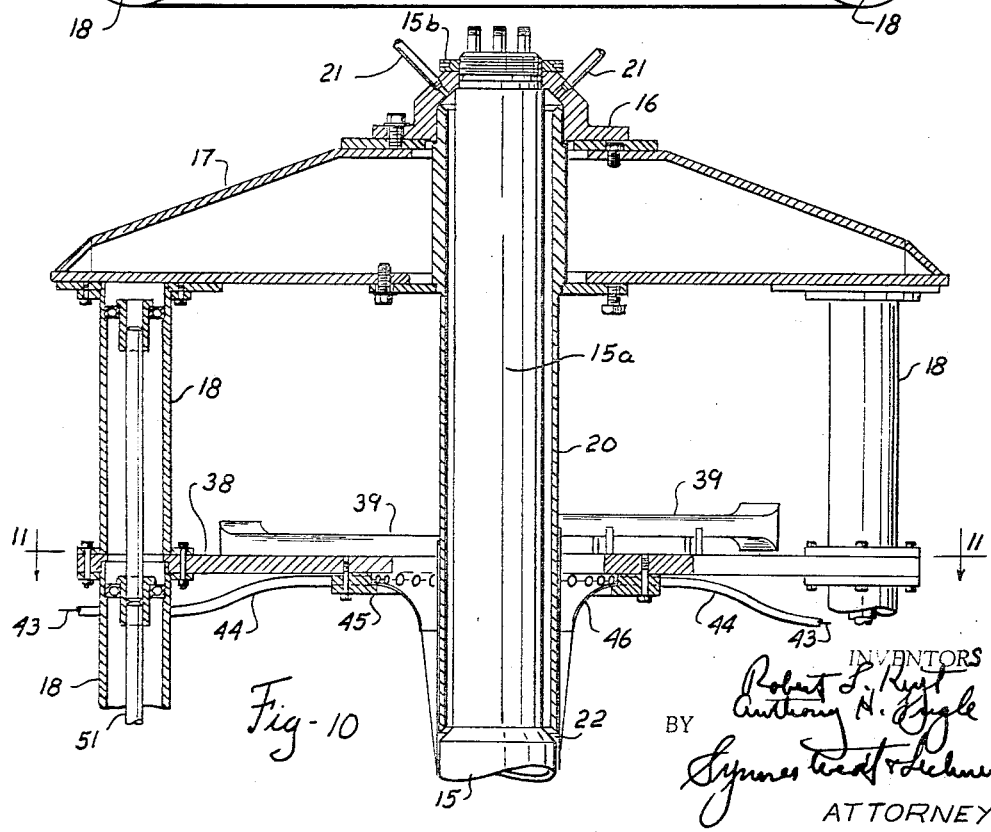

United States Patent Office 3,408,241
Patented Oct. 29, 1968

3,408,241
METHOD OF MAKING TUBULAR FIBER
REINFORCED RESIN ARTICLES
Robert L. Keyt and Anthony H. Ingle, Bristol, Va., assignors, by mesne assignments, to Koppers Company, Inc., Pittsburgh, Pa., a corporation of Delaware
Filed Mar. 2, 1965, Ser. No. 436,426
13 Claims. (Cl. 156—173)

ABSTRACT OF THE DISCLOSURE

The procedure for initiating a vertical downward extraction type operation for producing fiber reinforced resin articles in tubular form includes threading certain rovings initially through the die in which there is no core. Thereafter, the core is inserted into the die, moving in an upward direction. The initial rovings are then employed to draw other reinforcements through the forming passage of the die.

---

This invention relates to a method for initiating an extraction type of operation for producing fiber reinforced resin articles in tubular form. The invention, moreover, is particularly concerned with initiating operations of the general kind referred to and in which certain of the reinforcement elements are disposed helically in the tubular wall of the article being made.

A typical operation and typical equipment for carrying out such an operation are disclosed in copeding application Ser. No. 299,636, filed Aug. 2, 1963, now Patent 3,306,797 assigned to the assignee of the present application. Not all details of the equipment or of the technique there disclosed need be considered herein, but the general arrangement thereof is here briefly described, this general arrangement being illustrative of the kind of operation and equipment with which the starting procedure of the present invention is especially concerned.

As disclosed in the copending application referred to, a forming device is employed, this device including a die part and a core part cooperating to define a tubular forming passage through which the resin material and reinforcement are pulled during formation of the tubular article being made. The core part is provided with an upstream extension or guide, preferably of cylindrical shape on which various of the fiber reinforcement elements being used are laid up, these reinforcement elements being drawn along the surface of the guide extension of the core into and through the tubular forming passage.

Although the resin may be introduced into the system in a variety of ways, advantageously the fiber reinforcements are impregnated with a liquid heat hardenable resin material while on the guide extension prior to entrance into the forming passage. For this purpose, as disclosed in the application identified above, the guide extension of the core is flooded with the liquid resin material and as there disclosed the equipment is arranged with the core and guide extension extended vertically, so that the resin flows downwardly on the core extension toward the entrance end of the forming passage. A resin reservoir advantageously surrounds the guide extension at the entrance end of the forming passage, and an excess of resin is introduced into the system, which excess accumulates in the reservoir and is recirculated.

As the materials are drawn through the forming passage, the resin material is heated sufficiently to solidify the article within the forming passage.

The materials are advanced through the system by means of a puller mechanism, for example as disclosed in the copending application above referred to and also as disclosed in Boggs Patent 3,151,354, issued Oct. 6, 1964, the puller mechanism being located at the discharge end of the forming passage so as to engage and pull on the solidified article as it is deliverd from the forming passage.

In an operation and with equipment of the kind referred to and in a typical case of making a tube or pipe, it is desirable to incorporate several plies of reinforcements in the article being made, certain of these reinforcements advantageously compirsing elements which are wound helically about the axis of the guide extension of the core, and others of which advantageously comprise strips or the like of randomly oriented fibers, such as glass fiber mats. Indeed, for most purposes, a typical and highly desirable material to employ for the reinforcements is glass, and various forms of glass fiber reinforcements are available, including rovings in which the fibers are oriented lengthwise of the reinforcing elements, woven mats or strips in which threads or rovings are woven together in the manner of cloth or fabric, and also the random fiber mat or strip of the kind already mentioned. Certain reinforcement elements may incorporate both random fibers and also oriented fibers, for instance by the incorporation of rovings within the random fiber mat.

The use of random fiber mat, for example in strips introduced either lengthwise of the direction of feed into the forming passage, or introduced by helical winding around the guide extension of the core, is advantageous in the formation of a typical pipe or tube for a number of reasons. However, random fiber mats are inherently weak, especially when wetted with liquid resin, and in view of this weakness, difficulties are encountered in initiating the operation where random fiber mats are to be employed. The difficulties are particularly accentuated in a situation where the random fiber mat comprises the first ply laid on the guide extension of the core, and also where the random fiber mat is used in the position of the outermost ply, which comes in contact with the surface of the die part of the forming device. Because of the inherently weak character of the random fiber mats, they tend to break during threading-up operations.

Moreover, it is usually desirable to introduce a substantial volume of fiber reinforcement into the article being formed, thus necessitating the threading of a multiplicity of plies of reinforcements through the forming passage, and regardless of the type of the reinforcements themselves, this is awkward and difficult to do, particularly in the case of a tube or pipe in which the reinforcements should be uniformly distributed throughout the cross section of the annular or tubular passage between the die and core parts of the forming device.

With various of the foregoing considerations in mind, the present invention provides a novel method for starting up or initiating an extraction operation of the kind referred to, it being an objective of the invention to facilitate the threading operation and to avoid breakage of or damage to various reinforcement elements, and especially to random fiber strip reinforcements, during the start-up phase of the operation.

Briefly in accordance with the starting procedure of the present invention, certain rovings are initially threaded through the die part in the absence of the core part. Thereafter the core part is inserted into the die, preferably in an upstream direction. These initially threaded rovings are then employed as a means to draw through the forming passage the other reinforcement elements being used. Moreover, certain of the other reinforcement elements are desirably introduced in a special sequence as will later be explained, in order to accomplish additional advantages in the starting procedure.

How the foregoing and other objects and advantages are attained will appear more fully from the following description referring to the accompanying drawings which illustrate a preferred embodiment of equipment of the extraction type and which also illustrate the sequence of performance of certain steps employed in the starting procedure of the invention. In these drawings:

FIGURES 1 to 6 inclusive are somewhat diagrammatic elevational views of a vertical extraction machine of the general kind disclosed in the copending application above identified, these views showing a series of sequentially performed steps involved in the starting procedure;

Figure 7:
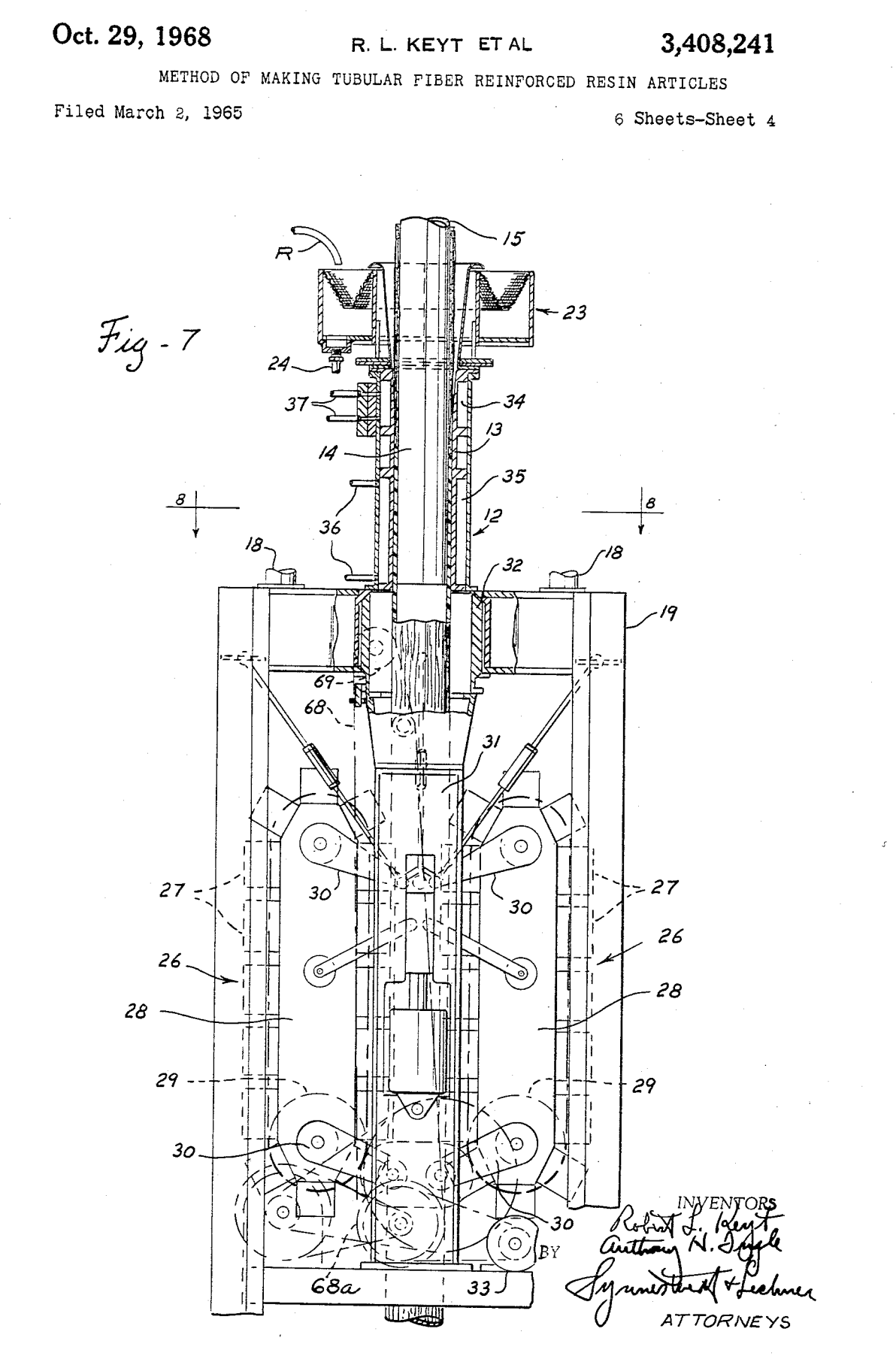

FIGURE 7 is an enlarged elevational view, with certain parts in vertical section, showing particularly the forming device, resin reservoir, and the puller mechanism;

FIGURE 8 is a still further enlarged plan view taken as indicated by the line 8—8 as applied to FIGURE 1 and also to FIGURE 7, and illustrating the forming device in horizontal section;

FIGURE 9 is an elevational view illustrating various of the parts shown in FIGURE 8;

Figure 5:
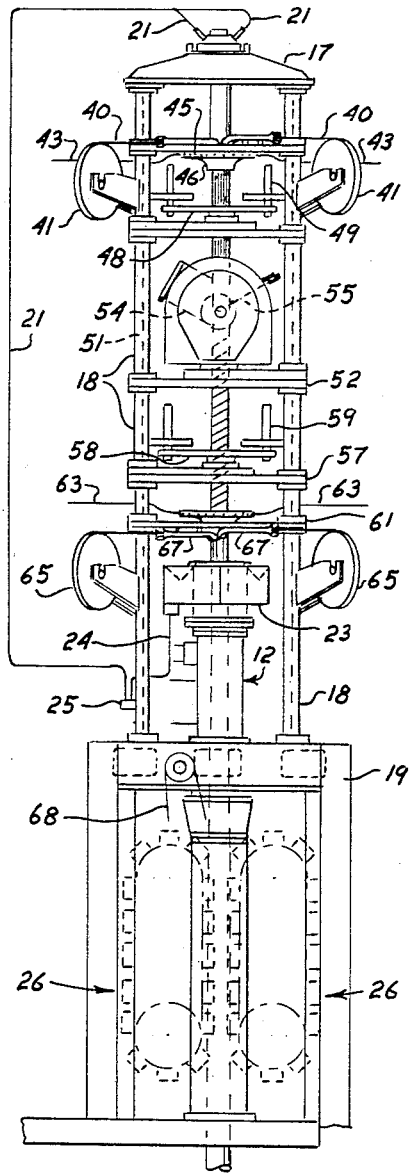

FIGURE 10 is a vertical sectional view taken as indicated by the line 10—10 on FIGURE 11, and illustrating the arrangement of the uppermost portion of the extraction machine shown in FIGURES 1 to 6, this view being on the scale of FIGURES 8 and 9; and FIGURE 11 is a plan view taken as indicated by the line 11—11 on FIGURE 10, and illustrating certain parts in horizontal section.

In the drawings, the extraction machine shown includes a forming device generally indicated by the numeral 12. As shown particularly in FIGURES 7 and 8, the forming device includes a die part 13 and a core part 14 which cooperate to define an annular or tubular forming passage. The core part 14 has an upward or upstream continuation 15 extended all the way from the entrance end of the die part to the top of the machine, the upper portion thereof being shown at the bottom of FIGURE 10 and the uppermost part of this guide extension being indicated at 15a in FIGURE 10, this part being of reduced diameter as compared with the part 15. The entire guide extension of the core and also the core itself is suspended in the apparatus from the upper end of the part 15a, for instance by means of a nut 15b, resting upon a fitting 16 which in turn is supported by the cap structure 17 of the extraction machine.

The cap structure 17 is supported by three posts 18, these posts being hollow and sectionalized and supported at their lower ends on the framing or mounting structure 19. The sectionalized posts 18 serve also to mount a series of reinforcement feed and winding devices arranged at various stages throughout the height of the machine, as will be further explained herebelow.

Referring again to FIGURE 10, it will be seen that the uppermost portion 15a of the core extension is surrounded by a sleeve 20, providing an annular chamber between the parts 15a and 20, the upper end of which chamber is supplied with liquid resin material through the supply pipes 21. The lower end of the chamber between the parts 15a and 20 delivers the resin material through the annular orifice 22 to the exterior surface of the guide extension 15, so as to flood the surface of the extension 15 with the liquid resin material and thus provide a coating or film of resin material on which various of the reinforcement elements to be employed are wound or laid up. In this way the reinforcement elements are impregnated as they are laid upon and advanced downwardly on the surface of the guide extension 15 of the core. At the upper end of the forming device 12 a resin pan or receptacle is provided, this being generally indicated at 23 in FIGURES 5, 6 and 7. In the preferred operation of the system an excess of resin is fed to the core extension 15, and the excess accumulates in the resin receptacle 23, from which it is withdrawn through the connection 24 leading into the intake side of a resin pump 25, the outlet side of which is connected with the piping 21 (see FIGURES 5, 6, 7 and 10). Makeup resin may be introduced into the system by the supply pipe R.

For reasons which will be explained more fully herebelow the resin reservoir or pan 23 is desirably vertically split into parts which are separable, so that the pan may be removed and replaced at certain times during the start-up procedure.

A puller mechanism is arranged below the lower or discharge end of the forming passage provided between the die part 13 and the core part 14, this puller mechanism comprising a pair of crawler treads generally indicated at 26—26 and the puller mechanism being arranged in the general manner of the Patent 3,151,354, identified above. While not all details of the puller mechanism need be considered herein, certain of the parts and functioning thereof should be noted, as follows:

Referring to FIGURE 7 in which the puller mechanism is illustrated in a somewhat diagrammatic and simplified form, each crawler tread comprises a series of gripping elements 27 which are mounted by means of a chain so as to travel in a closed circuit around a frame structure 28, at one end of which a sprocket 29 serves to drive the crawler chain. Each crawler frame is further mounted by means of a pair of pivoted arms 30 on the main frame 31 of the puller mechanism which in turn is slung from the mounting structure 19 for the machine by means of a ball and socket type of joint indicated at 32, this joint being fully disclosed and explained in the copending application Ser. No. 299,636, above identified.

By virtue of the mounting of the two crawler treads by means of the pivoted arms 30—30 and 30—30, the crawler treads are capable of motion toward and away from each other in orbital paths. This motion provides for movement of the crawler treads toward and away from a line representing the axis of the forming passage between the die and core parts 13 and 14. The crawler treads may thus be "opened up" or separated and this opening up is used in the starting procedure of the invention as will later appear.

The details of the drive mechanism for the crawler treads need not be considered herein, but it is noted that a motor 33 is shown at the bottom of FIGURE 7, this motor being connected through various transmission parts with the chain driving sprockets 29.

In operation of the equipment the two crawler treads 26 are yieldingly urged toward each other in order to provide for gripping engagement of the tube being formed between the pairs of gripping blocks or elements 27 of the two treads and in this way the article is withdrawn from the forming passage and in addition the reinforcement and resin materials are drawn into the forming passage.

From FIGURE 7 it will also be noted that the forming device 12 is provided with jacketing establishing an upper chamber 34 arranged adjacent the inlet end of the forming passage and a chamber 35 arranged in the lower portion of the forming device. The latter chamber is adapted to receive a heating medium, for instance by circulation of such a medium through the pipe connections 36, in order to heat the resin material as it passes through the forming passage and thereby solidify the article in the forming passage. The chamber 34 is adapted to receive a cooling medium for instance by circulation of such a medium through the pipe connections 37, and this serves to prevent premature curing and solidification of the resin in the entrance end of the forming passage and also in the resin reservoir located just above the forming device.

Preferably also the interior of the core part 13 and of the core extension 15 extending above the forming device is provided with a cooling means, at least down to a point corresponding to the region of the zone of the cooling chamber 34, this cooling being desirable to prevent premature curing and solidification of resin constituents on the guide extension 15 of the core. Equipment for effecting such cooling of the core is disclosed in Patent 3,306,797, above identified and need not be considered in detail herein.

Above the level of the resin reservoir 23, the tower structure which is made up of the three sectionalized hollow posts 18 is provided with a plurality of superimposed decks, each one of which serves to support reinforcement feed mechanism and thus represents a reinforcement feed station.

Figure 6:
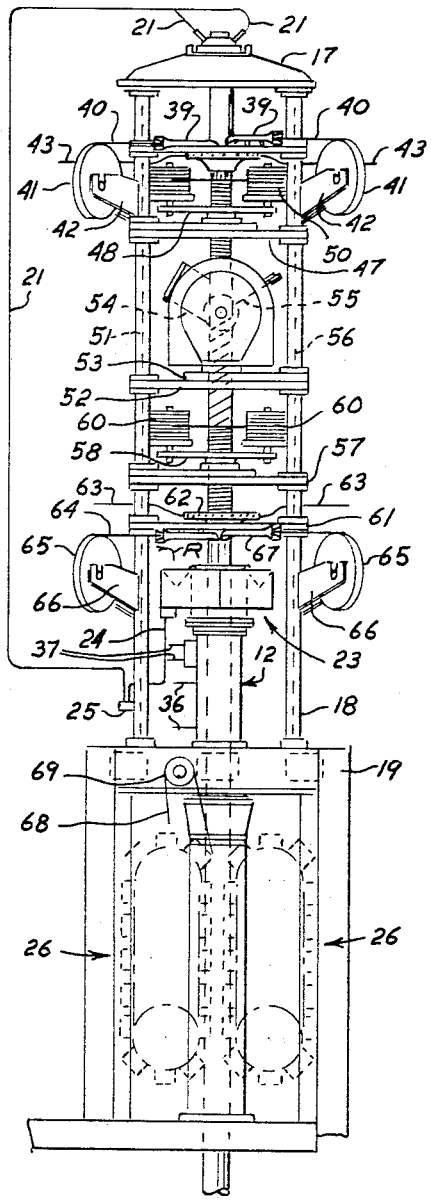

Beginning at the top of the tower (see FIGURES 6, 10 and 11) a deck 38 serves to mount a group of four generally horizontal tubular guides 39 for four fibrous reinforcement strips representing the first ply laid upon the guide extension 15 of the core. In FIGURE 6, showing the structure in elevation, two of these tubular guides 39 are seen projecting at angles toward the viewer, whereas in the vertical sectional view of FIGURE 10 the remaining two are seen to project away from the viewer. In FIGURE 6 the reinforcement strips fed through the guides 39 are indicated at 40, being supplied from rolls or reels 41 mounted upon brackets 42 connected with the tower structure. The reinforcement strips 40 are thus laid on the guide extension in an axial direction, i.e., in the direction of feed.

Just below the deck 38 provision is made for the feed of a second ply of reinforcements to the guide extension 15, this ply comprising a series of rovings 43, which as best seen in FIGURES 10 and 11, extend through radially converging guide tubes 44 associated with apertures in a guide ring 45, which guide the rovings into the funnel 46 and thus lay the ply of rovings against the guide extension 15 in positions extending generally axially of the guide extension and of the direction of feed. It will be understood that only a few of the rovings 43 and tubes 44 are shown in FIGURES 10 and 11 but that these rovings are fed through the guide ring 45 to the guide extension 15 from all sides of the apparatus.

At a level below the feed of the rovings 43, a deck 47 serves to mount a turntable 48 carrying spindles 49 for mounting spools 50 of rovings which are laid as a third ply upon the guide extension 15 by being helically wound upon the previously applied strips 40 and rovings 43.

Provision for rotating the turntable 48 includes drive shafting extended from drive mechanism toward the bottom of the machine upwardly through one of the sectionalized posts 18, an example of such shafting being illustrated at 51 toward the left of FIGURE 10. The details of this drive need not be considered herein but reference for such details may be made to Patent 3,306,797 identified above.

The next lower deck 52 serves to support a turntable 53 carrying a supply of reinforcement strip 54 and also a roving 55, the strip and roving both being helically applied with the roving lying over the strip. This feed arrangement need not be considered in detail herein, but for further information reference may be made to the copending application of Robert L. Keyt, Ser. No. 365,676, filed May 7, 1964, assigned to the assignee of the present application. Essentially this ply consists of the strip 54, but the strip is given added processing strength by virtue of the winding of the roving 55 therewith. The turntable 53 may be driven from a drive shaft within one of the hollow sectionalized posts, for instance the drive shaft indicated in dotted lines at 56 in FIGURE 6.

The next ply laid on the guide extension 15 is mounted upon a deck 57. Here there is a turntable 58 carrying spindles 59 adapted to support spools 60 of rovings in the same general manner as described above with reference to spools 50, these rovings also being wound helically, but preferably being of opposite hand, as compared with the rovings 50. Drive of the turntable 58 from the drive shafting 51 in the opposite direction is provided for by appropriate reversing gearing associated with the drive shafting 51 in a manner which is fully disclosed in Patent 3,306,797 above identified.

Below the deck 57 is another deck 51 which serves to support an apertured guide ring 62 similar to the ring 45 described above in order to lay an additional ply of longitudinal rovings upon the guide extension. The details of this arrangement are closely similar to those described above with particular reference to FIGURES 10 and 11 and need not be described again.

The final ply laid upon the guide extension 15 comprises fiber reinforcement strips 64 supplied from reels 65 mounted on brackets 66 projecting from the tower structure. Preferably this ply consists of four such strips which are guided to the core extension by means of guide tubes 67. The strips of this ply, as with the strips 40, are laid longitudinally upon the guide extension 15 at a point just above the resin reservoir 23.

As disclosed in Patent 3,306,797, it is contemplated that the mechanisms for winding reinforcements, and also the resin pump 25 shall be driven in synchronism with the puller mechanism. For this purpose (see particularly FIGURES 6, 7, 8 and 9) a belt 68 is associated with a part 68a of the drive transmission toward the bottom of the machine and is extended upwardly therefrom to engage and drive a pulley 69. Pulley 69 is mounted upon the input shaft of a gearing unit having an output shaft extended downwardly at right angles to the axis of the pulley 69 and carrying a drive pulley 70 (see FIGURES 8 and 9) with which a belt 71 is associated, this belt running around various additional pulleys at the three corners of the structure as viewed in FIGURE 8, including pulleys 72, 73, 74 and a slack take-up pulley 75. Pulleys 72 and 74 are associated with variable speed transmission units 76 and 77 which respectively serve to drive the vertical drive shafts 56 and 51 which extend upwardly through certain of the sectionalized posts 18 of the tower in order to provide the turntable drive for various of the reinforcement feed mechanisms.

By the drive transmission parts just referred to, reinforcement winding mechanisms are synchronized with the operation of the puller mechanism.

Attention is now called to the fact that it is advantageous in the making of various tubular articles, for instance pipe to employ random fiber mat at the surface, i.e., in the surface plies of the reinforcements. In the illustrative embodiment shown in the drawings and described above, it is assumed that the reinforcement strips 40 and 64 both comprise random fiber strips or mat. In the illustrative embodiment it is also assumed that the helically wound strip 54 incorporates random fibers, although this strip may also include rovings in the structure thereof, particularly rovings extended longitudinally of the strip.

It will be noted that in the illustrative embodiment a total of seven plies of reinforcements are incorporated in the article being made. This represents a very substantial bulk of material which would be difficult to thread through the forming passage, especially if attempts were made to effect the threading of the several plies sequentially, beginning with the strips 40 which are the first ones laid upon the guide extension 15. To meet various of the difficulties encountered in initiating an operation of the kind described above, a special sequence of steps is followed in accordance with the practice of the present invention, this special sequence being illustrated in FIGURES 1 to 6 inclusive, being described below.

First, as shown in FIGURE 1, although the strips 40 comprise the innermost ply, these strips are not initially threaded through the system. Instead the longitudinal rovings 43 and 63 are the first plies threaded through the system, and this is preferably accomplished in the absence of the core part 14 of the forming device, thus providing a relatively large unobstructed passage through the die part 13 of the forming device. Although the core 14 and the guide extension 15 need not necessarily comprise a single or interconnected structure, the latter arrangement is illustrated in the drawings and is convenient since the separation of the core also takes with it the guide extension and this facilitates the initial threading of the rovings through the system. Advantageously the crawler treads 26 of the puller mechanism are also opened or displaced from each other for the initial threading operation. Still further the resin reservoir 23 is removed, and it will be noted in FIGURE 1 that the resin reservoir is not present. Advantageously also the heating of the forming device is not initiated until after the threading is completed, the point of applying the heating being indicated below in the description of the latter stage of the starting procedure.

The rovings 43 and 63 are advantageously threaded through the system in advance of the other reinforcements for the reason that the rovings are of greater strength than the other elements, especially as compared with the random fiber mat, which is contemplated for use as the innermost ply and also as the outermost ply. In the procedure according to the invention the relatively strong rovings are employed as a means by which other reinforcements are threaded through the system.

After the rovings 43 and 63 are introduced, at a point below the forming device, in the region of the puller mechanism, the rovings are desirably divided into two bundles, as is indicated in FIGURES 1 and 2, so as to provide a space therebetween and from the top of the structure a cable 78 is let down through the central aperture in the cap structure 17 and all the way down through the various stations for the feed of reinforcements, through the die part of the forming device and through the open puller mechanism, and the assembly of the core part 14 and the guide extension 15 is fastened to the lower end of the cable 78, the core part and guide extension then being drawn upwardly or upstream between the open crawler treads and through the die part 14 into its normal position, being fastened at the top by means of the nut 15b (see FIGURE 10).

FIGURE 2 illustrates the equipment after the core part has been drawn up into its normal operating position, and in FIGURE 7 the lower end of the core part 14 will be seen in its normal position, i.e., just at the lower end of the forming device 12.

The next operation is illustrated in FIGURE 3. With the initially threaded rovings distributed at least roughly throughout the cross section of the forming passage, the strip 54 and the overlying roving 55 are helically wound upon the guide extension 15 on top of the rovings 43. As this winding takes place and the helically wound turns are drawn downwardly by pulling on the rovings downstream of the forming passage, the rovings 63 will of course be laid on top of the helical turns of the strip 54.

The next steps are illustrated in FIGURE 4, from which it will be seen that the random fiber strips 64 are being introduced, these also being fastened to the other reinforcements for instance by sewing or stitching and being drawn downwardly by pulling on the rovings downstream of the forming passage, and at this stage, a pilot piece 79 of the external shape of the tube being made is inserted in the puller mechanism and then the rovings and other reinforcements threaded up to this time are fastened to the pilot piece, for instance by an adhesive. The puller mechanism may then be closed in order to grip the pilot piece and subsequently used as a means for pulling on the rovings threaded up to this stage, in order to pull through the system the remaining plies, as is mentioned just below with reference to FIGURES 5 and 6.

Proceeding now to FIGURE 5, it will be noted that the random fiber strips 40 are being introduced. These are also fastened as by sewing or stitching to other reinforcements and are of course drawn through the system including the constriction represented by the forming passage by pulling on the reinforcements downstream of the forming passage. FIGURE 5 also indicates installation of the resin reservoir 23.

Finally, the helically wound rovings supplied from spools 50 and 60 are added as shown in FIGURE 6 and these, together with all of the other plies are drawn downwardly, by pulling on the reinforcements beyond the forming device. At the stage represented by FIGURE 6, heating of the forming device is also effected, and resin is introduced into the resin reservoir 23 and fed by the pump 25 to the orifice 22 in order to flood the guide extension 15 on which the reinforcements are being laid.

Although the pilot piece 79 is shown as having been inserted in FIGURE 4, it should be understood that insertion of the pilot piece need not necessarily occur at that exact point in the starting procedure. The time of insertion of the pilot piece will depend somewhat upon the particular pattern of plies of reinforcements being threaded into the system. The pilot piece is chiefly useful in the later phases of the threading procedure and in actually starting the operation of the production of the piece after the resin has been introduced into the system and the die has been heated.

The foregoing technique for initiating the operation provides for starting up the equipment with great facility, notwithstanding the fact that a very substantial bulk of reinforcements are threaded through the tubular forming passage. Moreover, the initial threading of the longitudinal rovings through the system makes practical the feed of relatively fragile random fiber mats as both the innermost and outermost plies.

Any of various resin materials may be used in the production of articles in the method and equipment described. The thermosetting or heat hardenable liquid resin materials are especially suitable, for instance the polyester laminating resins.

We claim:

1. In the manufacture of tubular fiber reinforced resin articles by laying up the fiber reinforcements on an upstream guide extension of the core part of an extraction machine having a forming device comprising die and core parts defining a tubular forming passage through which the fiber reinforcements impregnated with hardenable liquid resin material are pulled and in which the resin material is solidified, the method of initiating the operation of the extraction machine which comprises the following steps:
  (a) in the absence of the core part and of the guide extension threading a plurality of rovings longitudinally through the passage in the die part,
  (b) inserting the guide extension and the core part in an upstream direction through the passage in the die part,
  (c) laying up fiber reinforcement on the guide extension and fastening this reinforcement to the rovings at a point upstream of the tubular passage formed by the assembled die and core parts, and
  (d) advancing the reinforcement fastened to the rovings into and through the tubular forming passage by pulling on the rovings downstream of the forming passage.

2. In the manufacture of tubular fiber reinforced resin articles in an extraction machine having a forming device comprising die and core parts defining a tubular forming passage through which fiber reinforcements impregnated with hardenable liquid resin material are pulled and in which the resin material is solidified, the method of initiating the operation of the extraction machine which comprises the following steps:
  (a) in the absence of the core part threading a plurality of rovings longitudinally through the passage in the die part,
  (b) inserting the core part into the die part,
  (c) fastening a random fiber reinforcement strip to the rovings at a point upstream of the forming passage, and
  (d) advancing the random fiber reinforcement into and through the forming passage by pulling on the rovings downstream of the forming passage.

3. In the manufacture of tubular fiber reinforced resin articles by winding fiber reinforcements on an upstream guide extension of the core part of an extraction machine having a forming device comprising die and core parts defining a tubular forming passage through which the wound reinforcements impregnated with hardenable liquid resin material are pulled and in which the resin material is solidified, the method of initiating the operation of the extraction machine which comprises the following steps:
  (a) in the absence of the core part threading a plurality of rovings longitudinally through the passage in the die part,
  (b) inserting the core part into the die part,
  (c) with the threaded rovings extended upstream of the forming passage along the guide extension, winding fiber reinforcements on the guide extension over the rovings upstream of the forming passage, and
  (d) advancing the wound reinforcements into and through the forming passage by pulling on the threaded rovings downstream of the forming passage.

4. A method according to claim 3 and further including the following step:
  (e) after the wound reinforcements reach the forming passage flooding the guide extension with hardenable liquid resin material.

5. In the manufacture of tubular fiber reinforced resin articles by winding fiber reinforcements on an upstream guide extension of the core part of an extraction machine having a forming device comprising die and core parts defining a tubular forming passage through which the wound reinforcements impregnated with hardenable liquid resin material are pulled and in which the resin material is solidified, the method of initiating the operation of the extraction machine which comprises the following steps:
  (a) in the absence of the core part threading a plurality of rovings longitudinally through the passage in the die part,
  (b) inserting the core part into the die part,
  (c) fastening random fiber reinforcement strips to the threaded rovings upstream of the forming passage,
  (d) with the threaded rovings and with the random fiber strips both extended upstream of the forming passage along the guide extension, winding fiber reinforcements on the guide extension over the rovings and strips, and
  (e) advancing the wound reinforcements into and through the forming passage by pulling on the threaded rovings downstream of the forming passage.

6. In the manufacture of tubular fiber reinforced resin articles by the technique of laying up the fiber reinforcements on an upstream guide extension of the core part of an extraction machine having a forming device comprising die and core parts defining a tubular forming passage and having a removable reservoir for hardenable liquid fiber impregnated resin material surrounding the guide extension at the entrance end of the forming passage, said technique further including pulling the resin impregnated fiber reinforcements through the forming passage and solidifying the resin material as it passes through the forming passage, the method of initiating the operation of the extraction machine which comprises the following steps:
  (a) with the resin reservoir removed and in the absence of the core part threading some of the reinforcements longitudinally through the die,
  (b) inserting the core part into the die to form said forming passage, with said reinforcements being disposed in said passage,
  (c) pulling additional reinforcements through the forming passage between the die and core parts by means of the reinforcements initially threaded through the die, and
  (d) after at least some of the reinforcements have been threaded, establishing a body of hardenable liquid resin material adjacent the entrance of said die passage whereby said reinforcements are impregnated with resin before entering said forming passage.

7. The method of claim 6 including the step:
  (a) helically winding rovings around the first reinforcements surrounding said core part.

8. In the manufacture of tubular fiber reinforced resin articles in an extraction machine having a forming device comprising die and core parts defining a tubular forming passage through which fiber reinforcements impregnated with hardenable liquid resin material are pulled and in which the resin material is solidified, the method of initiating the operation of the extraction machine which comprises the following steps:
  (a) in the absence of the core part threading a plurality of rovings longitudinally through the die part,
  (b) inserting the core part into the die part thereby establishing the tubular forming passage,
  (c) distributing the threaded rovings throughout the cross section of the tubular forming passage in the manner of a ply.
  (d) upstream of the forming passage fastening a ply of random fiber reinforcement strip to the ply of rovings at the inside surface thereof, and
  (e) advancing the random fiber strip ply into and through the forming passage by pulling on the ply of rovings downstream of the forming passage.

9. In the manufacture of tubular fiber reinforced resin articles by winding fiber reinforcements on an upstream guide extension of the core part of an extraction machine having a forming device comprising die and core parts defining a tubular forming passage through which the wound reinforcements impregnated with hardenable liquir resin material are pulled and in which the resin material is solidified, the method of initiating the operation of the extraction machine which comprises the following steps:
  (a) in the absence of the core part threading a plurality of rovings longitudinally through the passage in the die part,
  (b) inserting the core part into the die part,
  (c) distributing the threaded rovings throughout the cross section of the tubular forming passage in the manner of a ply,
  (d) at a point upstream of the forming passage and with the ply of rovings extended upstream of the forming passage, fastening a ply of random fiber reinforcement strip to the ply of rovings at the inside surface thereof, and
  (e) with the ply of random fiber strip and the ply of rovings extended upstream of the forming passage along the guide extension, helically winding rovings around the guide extension in a ply overlying the plies of rovings and random fiber strip, and advancing the plies of helical windings and random fiber strip by pulling on the ply of rovings downstream of the forming passage.

10. In the manufacture of tubular fiber reinforced resin articles by winding fiber reinforcements on an upstream guide extension of the core part of an extraction machine having a forming device comprising die and core parts defining a tubular forming passage through which the wound reinforcements impregnated with hardenable liquid resin material are pulled and in which the resin material is solidified the method of initiating the operation of the extraction machine which comprises the following steps:
  (a) in the absence of the core part threading a plurality of rovings longitudinally through the passage in the die part,
  (b) inserting the core part into the die part,
  (c) distributing the threaded rovings throughout the cross section of the tubular forming passage in the manner of a ply,
  (d) at a point upstream of the forming passage and with the ply of rovings extended upstream of the forming passage helically winding a reinforcement strip around the guide extension in a ply surrounding the ply of rovings, and
  (e) advancing the ply of strip reinforcement into the forming passage by pulling on the ply of rovings.

11. A method according to claim 10 and further including the following steps:
(f) between the entrance of the forming passage and the point of application of the ply helical winding strip reinforcement, fastening a ply of random fiber strip reinforcement to and outside of the helically wound ply, and
(g) advancing the random fiber strip ply into the forming passage by pulling on the ply of longitudinal rovings downstream of the forming passage.

12. A method according to claim 10 and further including the following steps:
(f) at a point upstream of the application of helical winding of the strip reinforcement, fastening a ply of random fiber reinforcement strip to the inside surface of the ply of rovings, and
(g) advancing the random fiber strip ply into the forming passage by pulling on the longitudinal rovings downstream of the forming passage.

13. A method according to claim 12 and further including the following step:
(h) helically winding turns of roving in a ply surrounding the helically wound strip.

References Cited
UNITED STATES PATENTS

| | | | |
|---|---|---|---|
| 3,235,429 | 2/1966 | Boggs | 156—441 XR |
| 3,306,797 | 2/1967 | Boggs | 156—171 |
| 2,871,911 | 2/1959 | Goldsworthy et al. | 156—441 XR |

PHILIP DIER, *Primary Examiner.*